United States Patent
Loray et al.

(10) Patent No.: US 11,005,241 B2
(45) Date of Patent: May 11, 2021

(54) DISTRIBUTION OF A DIELECTRIC GASEOUS MIXTURE TO A HIGH-VOLTAGE APPARATUS

(71) Applicant: L'Air Liquide, Société Anonyme pour l'Etude et l'Exploitation des Procédés Georges Claude, Paris (FR)

(72) Inventors: Frédéric Loray, Echirolles (FR); Hervé Dulphy, Jarrie (FR); Ariel Satin, Jarrie (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 173 days.

(21) Appl. No.: 16/317,061

(22) PCT Filed: Jul. 7, 2017

(86) PCT No.: PCT/FR2017/051854
§ 371 (c)(1),
(2) Date: Jan. 11, 2019

(87) PCT Pub. No.: WO2018/011489
PCT Pub. Date: Jan. 18, 2018

(65) Prior Publication Data
US 2019/0245330 A1 Aug. 8, 2019

(30) Foreign Application Priority Data

Jul. 13, 2016 (FR) ...................................... 1656763

(51) Int. Cl.
*H02B 13/055* (2006.01)
*H01H 33/56* (2006.01)
(Continued)

(52) U.S. Cl.
CPC ............ *H02B 13/055* (2013.01); *F17C 5/06* (2013.01); *F17C 7/02* (2013.01); *H01H 33/562* (2013.01);
(Continued)

(58) Field of Classification Search
CPC .............. H02B 13/055; H01H 33/562; H01H 2033/566; H01H 33/22; F17C 5/06;
(Continued)

(56) References Cited

U.S. PATENT DOCUMENTS 5,761,911 A  6/1998  Jurcik et al.
6,076,359 A  6/2000  Jurcik et al.
(Continued)

FOREIGN PATENT DOCUMENTS

DE  10 2014 119028  6/2016
EP  1 538 390  6/2005
(Continued)

OTHER PUBLICATIONS

International Search Report for PCT/FR20171051854, dated Sep. 25, 2017 (English machine translation).
(Continued)

*Primary Examiner* — Akm Zakaria
(74) *Attorney, Agent, or Firm* — Elwood L. Haynes

(57) ABSTRACT

A method of distributing an electrically insulating liquefied gas mixture to high-voltage electrical equipment from a storage means containing an insulating gas mixture, including: heating the insulating gas mixture to a temperature such that the contents of the storage means are a homogeneous fluid; and withdrawing the insulating mixture resulting from step a) to fill high-voltage electrical equipment by raising the temperature of the mixture resulting from step a), wherein, during step b), a set value for regulation is applied at variable pressure, calculated in real time based on weighing the
(Continued)

storage means, when the change in the set value of pressure is less than 0.2 bar per 1 kg/m³ of change in density, and then a set value for regulation is applied at constant temperature until the storage means is emptied of its content.

12 Claims, 1 Drawing Sheet

(51) Int. Cl.
*F17C 5/06* (2006.01)
*F17C 7/02* (2006.01)
*H01H 33/22* (2006.01)

(52) U.S. Cl.
CPC ... *F17C 2221/03* (2013.01); *F17C 2223/0115* (2013.01); *F17C 2260/04* (2013.01); *H01H 33/22* (2013.01); *H01H 2033/566* (2013.01)

(58) Field of Classification Search
CPC .............. F17C 7/02; F17C 2223/0115; F17C 2260/04; F17C 2221/03
See application file for complete search history.

(56) References Cited

U.S. PATENT DOCUMENTS

| | | |
|---|---|---|
| 6,199,384 B1 | 3/2001 | Udischas et al. |
| 9,771,314 B2 * | 9/2017 | Hartmann ............ B01J 35/1019 |
| 2005/0132720 A1 | 6/2005 | Rameau et al. |
| 2016/0043533 A1 * | 2/2016 | Tehlar ................. G01N 33/004 |
| | | 361/618 |
| 2017/0162349 A1 | 6/2017 | Girodet et al. |
| 2018/0358148 A1 * | 12/2018 | Kieffel ................. F17C 13/028 |

FOREIGN PATENT DOCUMENTS

| | | | |
|---|---|---|---|
| FR | 3 023 649 | 1/2016 | |
| WO | WO 1998/023363 A1 * | 6/1998 | ............... B01F 3/02 |
| WO | WO 2014 037031 | 3/2014 | |

OTHER PUBLICATIONS

International Search Report for corresponding PCT/FR2017/051854, dated Sep. 25, 2017.
International Written Opinion for PCT/FR2017/051854, dated Sep. 25, 2017 (English machine translation).

* cited by examiner

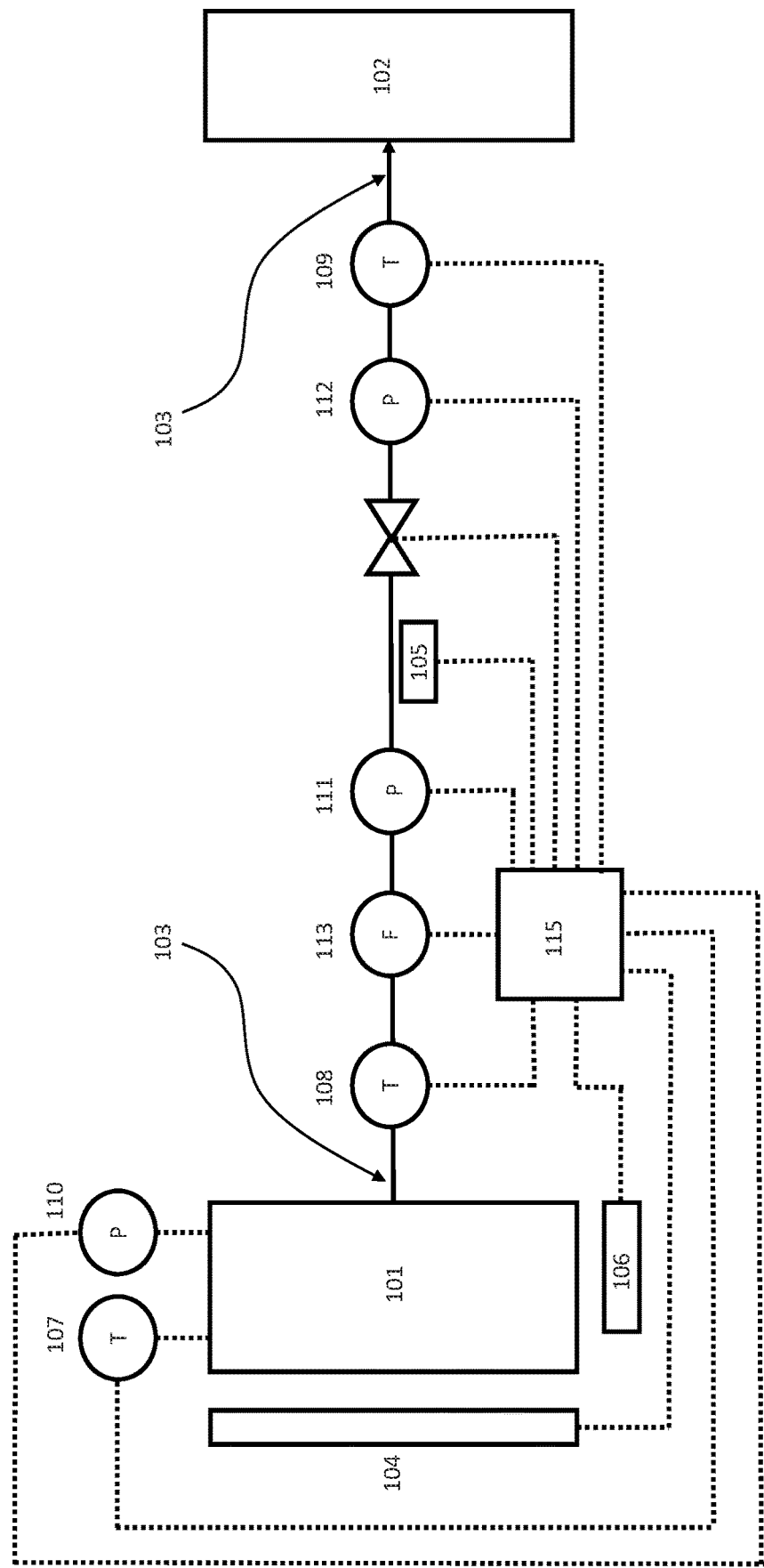

DISTRIBUTION OF A DIELECTRIC GASEOUS MIXTURE TO A HIGH-VOLTAGE APPARATUS

CROSS REFERENCE TO RELATED APPLICATIONS

This application is a 371 of International PCT Application PCT/FR2017/051854, filed Jul. 7, 2017, which claims priority to French Patent Application No. 1656763, filed Jul. 13, 2016, the entire contents of which are incorporated herein by reference.

BACKGROUND

The present invention relates to a method of distributing a dielectric insulating liquefied gas mixture to high-voltage electrical equipment.

In the present description, the term "high-voltage electrical equipment" denotes both equipment for high-voltage distribution stations and high-voltage power transmission lines.

Gas-insulated high-voltage switchgear is known as metal-encapsulated switchgear or gas-insulated switchgear (GIS).

Gas-insulated high-voltage lines are known as gas-insulated lines (GIL). In the present description, the term "high-voltage" denotes a voltage greater than or equal to 12000 volts, of alternating or direct current.

In the present description, the term "storage means" denotes a closed container for storage of gases or gas mixtures. It applies both to a gas cylinder and a container.

One of the main technologies for insulation of electrical equipment is insulation by a dielectric gas or gas mixture confined under pressure around components and elements under voltage. This insulating gas or gas mixture provides the function of extinction of the arc resulting from circuit-breaking.

At present, the gas most often used in this type of equipment is sulfur hexafluoride ($SF_6$). This gas in fact has a relatively high dielectric strength, good thermal conductivity and low dielectric loss. It is chemically inert and nontoxic to humans and animals and, after being dissociated by an electric arc, it recombines quickly and almost completely. Moreover, it is nonflammable and its price is still moderate. However, $SF_6$ has the major drawback of having a global warming potential (GWP) of 22 200 (relative to $CO_2$ over 100 years) and it remains in the atmosphere for 3200 years, which places it among the gases with a high greenhouse effect.

Therefore the Kyoto Protocol (1997) put $SF_6$ on the list of gases whose emissions must be limited.

The best way of limiting emissions of $SF_6$ is to limit the use of this gas, which has led manufacturers to look for alternatives to $SF_6$. The so-called "simple" gases, such as air or nitrogen, which do not have a negative impact on the environment, have a much lower dielectric strength than $SF_6$. Thus, for example, the dielectric strengths under AC voltage (50 Hz) of air and nitrogen are approximately three times lower than that of $SF_6$.

Accordingly, the use of these simple gases for electrical insulation and/or electric arc extinction in electrical equipment involves dramatically increasing the volume and/or the filling pressure of said equipment, which runs counter to efforts made in recent decades for developing compact electrical equipment that is safe for personnel, and with smaller and smaller overall dimensions.

A technological breakthrough is beginning in the field of high-voltage equipment insulated with $SF_6$ gas. Faced with environmental and regulatory constraints (Kyoto Protocol and COP21), the $SF_6$ technology is being reworked to find replacement gas mixtures that have a reduced environmental impact.

A liquefied gas stored in a storage means is made up of two phases, liquid and gaseous, in equilibrium with one another. This equilibrium means that at a given temperature, a liquefied gas has a well-defined pressure and that this pressure varies as a function of the temperature, according to a relation, called the Clapeyron relation, the parameters of which are specific to each gas.

When the gas phase is withdrawn from a liquefied gas cylinder, part of the liquid must be vaporized so as to regenerate the gas phase as it is used, in order to maintain the equilibrium. The liquid therefore cools down owing to the energy used for passing from one phase to another.

To avoid these problems, it is necessary to supply the energy required for compensating this loss, if not enough energy is supplied, or not quickly enough, to gasify the liquid and thus regenerate the vapor phase, there will be a drop in temperature, flow rate and pressure.

SUMMARY

One solution is to heat the cylinder, controlling the heating by means of the pressure in the cylinder.

This allows heating provided the pressure is below the pressure corresponding to the ambient temperature, and no longer allows heating if the liquid reaches or is at ambient temperature. By regulating the supply of energy corresponding to a temperature slightly lower than the ambient temperature, it is possible to dispense with tracing the distribution network provided there is no cold point along the latter. Such a system is described in U.S. Pat. Nos. 5,761,911, 6,076,359, and 6,199,384.

In general, the heating techniques used for increasing the flow rates of liquefied gases consist of heating the walls of the cylinder using a resistive heating element of the heating belt type, heating cord, or jacket for circulation of heat-transfer fluid. This type of heating has the drawback of energy transfer that is greatly limited by the low heat conduction from the heating element to the cylinder, on the one hand, and by the increase in overall thermal inertia of the system due to the intrinsic thermal inertia of the heating element on the other hand. This results in a limitation of the usable flow rate despite appreciable supply of energy and a shift with respect to the demand for gas. In other words, the energy response of such installations is inadequate.

The applicant developed a method in the past: AVP for All Vapor Phase. The principle was based on measuring the pressure in the distribution line, closest to the drum. This made it possible to determine the temperature of the liquid from the Clapeyron relation. Knowing the temperature, and on the basis of the thermal models developed, it was possible to estimate the energy necessary for stabilizing the temperature. The temperature inside the drums was very stable, based on an estimate from the measured pressure.

However, with this resistive approach for heating, efficiency was low and the response was too slow.

In recent years, the applicant has developed an inductive belt for optimizing the energy transfers and thus reach higher distribution flow rates. The principle consists of exploiting the ferromagnetic properties of the envelope of the container and heating it by electromagnetic induction means. We found that far higher efficiency was obtained, which could reach 80% to 90% on steel for example.

Induction heating makes energy transfer by conduction unnecessary, since the currents induced by the inductor heat the material of the cylinder directly in its thickness. We thus find performance five to ten times greater than the performance of a heating system using a heating element at equal installed power, for example for a liquefied gas such as $C_4F_8$, without causing substantial desorption of impurities from the surface of the container.

As an alternative to $SF_6$, one of the big players in the field of high-voltage equipment has developed a mixture of liquefied gases with excellent dielectric performance. However, there is no equipment for carrying out the manipulations of gases that are essential for using this mixture in high-voltage equipment.

The existing difficulties for developing equipment for carrying out the manipulations of gases essential for using this mixture in high-voltage equipment are for example as follows:

- The liquefied mixture is intrinsically inhomogeneous in the cylinder or the storage container;
- Withdrawing it in the gas or liquid phase means altering the respective proportions of the constituents of the mixture;
- The wide range of ambient temperatures defined for use of the equipment makes it difficult to regulate the heating;
- The Joule-Thomson effect of the gas mixture due to expansion causes cooling of the gas and partial recondensation. This phenomenon alters the proportions of the constituents of the mixture;
- The maximum permissible temperature for the storage means is limited by the regulations in order to respect the design conditions of pressure and temperature;
- The resistive technology for heating cylinders that is widely used industrially does not allow sufficiently precise regulation for reaching the critical temperature required without exceeding the maximum temperature of the cylinders.

Faced with these difficulties, the present inventors have developed a method allowing distribution of liquefied mixtures replacing $SF_6$ gas, uniformly, with great stability of the original proportion of the mixture and a sufficient flow rate for the solution to be industrially viable.

However, the respective physical properties of the fluids making up the mixture make the mixture intrinsically heterogeneous within the storage means.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 is a schematic representation the method of distributing an electrically insulating liquefied gas mixture to high-voltage electrical equipment, in accordance with one embodiment of the present invention.

DESCRIPTION OF THE PREFERRED EMBODIMENTS

Element Numbers

101=storage means
102=high-voltage electrical equipment
103=electrically insulating liquefied gas mixture
104=heating means for storage means
105=heating means downstream of storage means (upstream of Joule Thompson valve)
106=weighing means
107=temperature sensor for gas mixture inside storage means
108=temperature sensor for gas mixture outside storage means upstream of Joule-Thompson valve
109=temperature sensor for gas mixture outside storage means downstream of Joule-Thompson valve
110=pressure sensor for gas mixture inside storage means
111=pressure sensor for gas mixture outside of storage means upstream of Joule-Thompson valve
112=pressure sensor for gas mixture outside of storage means downstream of Joule-Thompson valve
113=flowmeter for electrically insulating liquefied gas mixture
114=Joule-Thompson valve
115=controller (regulator)

One of the problems solved by the method according to the invention is to homogenize the mixture in the storage means 101 and then transfer it into the high-voltage equipment 102 without any loss of homogeneity.

The present inventors have elaborated a solution allowing the aforementioned problems to be solved.

The present invention relates to a method of distributing an electrically insulating liquefied gas mixture 103 to high-voltage electrical equipment 102 from a storage means 101 containing an insulating gas mixture 103, said method comprising the following steps:

Step a): heating 104 said insulating gas mixture 103 to a temperature 107 such that the contents of the storage means 101 are a homogeneous fluid;

Step b): withdrawing the insulating mixture 103 resulting from step a) to fill high-voltage electrical equipment 102 by raising the temperature 108 of said mixture resulting from step a);

characterized in that, during step b), a set value for regulation is applied at variable pressure 110, calculated in real time 115 based on weighing 106 the storage means 101, when the change in the set value of pressure 110 is less than 0.2 bar per 1 $kg/m^3$ of change in density, and then a set value for regulation is applied at constant temperature 108 until the storage means 101 is emptied of its contents.

According to other embodiments, the invention also relates to:

A method as defined above, characterized in that step a) consists of heating 104 said insulating gas mixture 103 to a temperature 107 greater than or equal to its critical temperature in order to obtain a homogeneous supercritical fluid inside said storage means 101.

A method as defined above, characterized in that, during step b), the insulating mixture 103 undergoes expansion to a pressure 112 between 0 bar and 12 bar relative, preferably from 5 bar to 10 bar relative.

A method as defined above, characterized in that the temperature 107 of the insulating mixture 103 resulting from step a) is raised to a temperature 108 between 65° C. and 90° C. during withdrawal in step b).

A method as defined above, characterized in that the pressure 110 inside the storage means 101 between step a) and step b) is between 15 bar and 90 bar relative.

A method as defined above, characterized in that the temperature 107 of the insulating mixture 103 inside the storage means 101 between step a) and step b) is between 40° C. and 65° C.

A method as defined above, characterized in that said storage means 101 comprises heating means 104 consisting of electromagnetic induction means capable of heating the insulating mixture 103 inside said storage means 101.

A method as defined above, characterized in that the insulating gas mixture 103 comprises at least 80 mol % of $CO_2$ in the case of a two-component mixture and in that it comprises at least 50 mol % in the case of mixtures comprising at least three components.

A method as defined above, characterized in that the insulating mixture 103 comprises at least one component selected from the fluoronitriles having at least four carbon atoms.

A method as defined above, characterized in that the insulating mixture 103 comprises between 2 and 20 mol % of said component selected from the fluoronitriles having at least four carbon atoms.

A method as defined above, characterized in that said storage means 101 has a capacity for storage of said insulating mixture between 30 L and 700 L.

A method as defined above, characterized in that, in step b), the rate of withdrawal 113 of the insulating mixture 103 resulting from step a) is between 10 $Nm^3/h$ and 50 $Nm^3/h$, and preferably between 15 and 30.

The normal cubic meter, with the symbol $Nm^3$ or sometimes $m^3(n)$, is a unit of measurement of the amount of gas that corresponds to the contents of a volume of one cubic meter, for a gas in normal conditions of temperature and pressure (0 or 15 or less often 20° C. depending on the frames of reference and 1 atm, or 101 325 Pa). For a pure gas, a normal cubic meter corresponds to about 44.6 moles of gas.

It is therefore a method of regulating 115 the heating 105 of means of storage 101 of liquefied mixtures 103 in order to make these mixtures 103 homogeneous before and during transfer. This method of regulating 115 heating 104 is useful and effective throughout transfer, i.e. from the storage means 101 full state to the storage means 101 empty state.

Heating 104 the storage means 101 makes it possible to exceed the critical temperature of the mixture 103 and obtain a homogeneous dielectric mixture in situ.

When the density of the mixture 103 inside the storage means 101 no longer allows the state of supercritical fluid to be maintained, the present invention makes it possible to maintain the fluid in the gas phase, which makes it intrinsically homogeneous.

The invention allows high-voltage equipment 102 to be filled from a storage means 101 of liquefied dielectric gas mixture 103 without changing the initial proportions of the mixture, in conditions of temperature 108 and pressure 111 suitable for filling (10° C. to 30° C. and 0 to 12 bar relative), at values of flow rates that are sufficient for the final use (greater than 15 $Nm^3/h$).

The solution for making the mixture 103 homogeneous consists of heating 104 the storage means 101.

For this purpose, the invention combines a set of solutions for regulating 115 the heating 104 of the storage means 101 so as to comply with all the constraints and to overcome all the difficulties described above.

These solutions for regulating 115 the heating operate as follows:

1. Regulating 115 the heating 104 of the storage means 101 based on a set value of pressure 110, the latter being variable and calculated 115 in real time on the basis of weighing 105, when the change in the set value of pressure 110 is less than 0.2 bar per 1 kilogram per cubic meter of change in density (in other words, when the derivative of the set value of pressure as a function of the density is less than 0.2 $bar \cdot kg^{-1} \cdot m^3$).

2. Regulating 115 the heating 104 of the storage means 101 based on the set value of constant temperature 107, when the change in the set value of pressure 110 is greater than 0.2 bar per 1 kilogram per cubic meter of change in density (in other words, when the derivative of the set value of pressure as a function of the density is greater than 0.2 $bar \cdot kg^{-1} \cdot m^3$).

3. Calculation of the pressure 110 value set in step 1 so that the temperature 107 remains below the maximum permissible temperature for the storage means 101, so that the pressure 110 remains below the maximum permissible pressure for the storage means, and so that the pressure 110 & temperature 107 pair never leads to recondensation of the mixture 103.

The principle of homogenization of the dielectric mixture used in the method according to the present invention is to heat 104 the storage means 101 until it is in the supercritical range. The properties of supercritical fluids (high internal energy, low viscosity) make it possible to guarantee homogenization of the fluids with one another.

Supercritical fluids have properties close to gases and liquids. Their viscosity and molecular agitation are close to those of gases. A mixture in the supercritical phase will therefore be intrinsically homogeneous.

The supercritical state may be attained by exceeding the critical temperature and critical pressure of the mixture 103. However, this heating 104 must be regulated 115 so that neither the design temperature, nor the design pressure of the storage means 101 is exceeded.

Two problems arise for ensuring homogenization of the mixture 103 during withdrawal of the latter for filling the high-voltage equipment 102:

maintaining homogeneity of the mixture 103 within the storage means 101 despite the decrease in density due to consumption;

making the mixture 103 suitable for use at a pressure 111 and temperature 108 guaranteeing absence of recondensation and therefore of loss of homogeneity.

As the mixture 103 is consumed, the density will decrease, so that a higher heating temperature 107 is required. However, this temperature 107 is limited by the design temperature of the storage means 101 (generally 65° C.).

Expanding 114 the mixture 103 to lower it to the pressure 112 of use will cool the fluid by the Joule-Thomson effect. The invention makes it possible to heat 105 the fluid 103 downstream of the storage means 101 and upstream of the expansion 114 so as to compensate this temperature drop. This solution makes it possible to maintain a very high flow rate.

The method according to the present invention is based on adjusting the pressure 110 in the storage means 101 by controlling 115 the heating 104, so as to pass from the supercritical state to the gas phase without passing through the condensation zone.

This pressure adjustment 115 is carried out based on the density calculated in real time (dynamic weighing 106 of the storage means 101).

The mixture 103 in the storage means 101 is therefore at high temperature 107 and pressure 110 (temperature above ambient temperature and pressure of some tens of bar). Simple expansion 114 cannot guarantee homogeneity, as in many cases it is accompanied by partial recondensation of the mixture.

Moreover, the Joule-Thomson effect 114 of the mixture 103 would lead to a very low temperature 109 of the fluid 103 after expansion.

The method according to the present invention is based on heating 104 the mixture 103 prior to withdrawal so as then to be able to expand it 114, avoiding the condensation zone.

The values for heating 104, 105 and expansion 114 depend on the physical properties of the mixture.

The gas mixture 103 typically used in the method according to the present invention for distribution of homogeneous liquefied mixtures corresponds to $CO_2$ and to Novec®, a registered trademark of 3M. For example, the mixture comprises 7 mol % of Novec® (the mixture range may for example comprise from 2 mol % to 20 mol % of Novec®).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method of distributing an electrically insulating liquefied gas mixture to high-voltage electrical equipment from a storage means containing an electrically insulating liquefied gas mixture, the method comprising the following steps:
   Step a): heating the electrically insulating liquefied gas mixture to a temperature such that the contents of the storage means are a homogeneous fluid;
   Step b): withdrawing the electrically insulating liquefied gas mixture resulting from step a) to fill high-voltage electrical equipment by raising the temperature of the electrically insulating liquefied gas mixture resulting from step a);
   wherein, during step b), a set value for regulation is applied at variable pressure, calculated in real time based on weighing the storage means, when the change in the set value of pressure is less than 0.2 bar per 1 kg/m³ of change in density, and then a set value for regulation is applied at constant temperature until the storage means is emptied of its content.

2. The method of claim 1, wherein step a) comprises heating the electrically insulating liquefied gas mixture to a temperature greater than or equal to a critical temperature in order to obtain a homogeneous supercritical fluid inside the storage means.

3. The method of claim 1, wherein, during step b), the electrically insulating liquefied gas mixture undergoes expansion to a pressure between 0 bar and 12 bar relative.

4. The method of claim 3, wherein the temperature of the electrically insulating liquefied gas mixture resulting from step a) is raised to a temperature between 65° C. and 90° C. during withdrawal in step b).

5. The method of claim 1, wherein the pressure inside the storage means between step a) and step b) is between 15 bar and 90 bar relative.

6. The method of claim 1, wherein the temperature of the electrically insulating liquefied gas mixture inside the storage means between step a) and step b) is between 40° C. and 65° C.

7. The method of claim 1, wherein said storage means comprises heating means consisting of electromagnetic induction means capable of heating the electrically insulating liquefied gas mixture inside the storage means.

8. The method of claim 1, wherein the electrically insulating liquefied gas mixture comprises at least 80 mol % of $CO_2$ in the case of a two-component mixture and comprises at least 50 mol % in the case of mixtures comprising at least three components.

9. The method of claim 8, wherein that the electrically insulating liquefied gas mixture comprises at least one component selected from the fluoronitriles having at least four carbon atoms.

10. The method of claim 9, wherein the electrically insulating liquefied gas mixture comprises between 2 and 20 mol % of said component selected from the fluoronitriles having at least four carbon atoms.

11. The method of claim 1, wherein said storage means has a capacity for storage of the electrically insulating liquefied gas mixture between 30 L and 700 L.

12. The method of claim 1, wherein, in step b), the rate of withdrawal of the electrically insulating liquefied gas mixture resulting from step a) is between 10 Nm³/h and 50 Nm³/h.

* * * * *